United States Patent [19]
Weber

[11] Patent Number: 4,773,763
[45] Date of Patent: Sep. 27, 1988

[54] DOUBLE SCREW EXTRUDER

[76] Inventor: Johannes Weber, Bamberger Strasse, 8640 Kronach, Fed. Rep. of Germany

[21] Appl. No.: 142,921

[22] Filed: Jan. 12, 1988

[30] Foreign Application Priority Data

Jan. 13, 1987 [DE] Fed. Rep. of Germany ....... 3700771

[51] Int. Cl.⁴ ............................ B29B 1/10; B01F 7/08
[52] U.S. Cl. ........................................ 366/83; 74/417; 366/85; 425/208
[58] Field of Search ........................ 366/83, 84, 85, 86, 366/97, 292, 297, 298, 301, 318; 425/208, 366, 376 R; 74/417, 423

[56] References Cited

U.S. PATENT DOCUMENTS

| | | | |
|---|---|---|---|
| 3,520,205 | 7/1970 | Halibrand | 74/417 |
| 3,605,188 | 9/1971 | McCormick | 925/376 R |
| 4,047,705 | 9/1977 | Hanslik | 366/85 |
| 4,408,888 | 10/1983 | Hanslik | 366/83 |

*Primary Examiner*—Robert W. Jenkins
*Attorney, Agent, or Firm*—McCormick, Paulding & Huber

[57] ABSTRACT

A double screw extruder includes two conical extruder screws whose screw shafts are arranged at an angle to one another corresponding to the conicity of the extruder screws, and a drive apparatus for driving one of the screw shafts. The other screw shaft is driven from the first screw shaft through a bevel gear drive provided with teeth arranged in herringbone or arrow fashion.

4 Claims, 1 Drawing Sheet

U.S. Patent  Sep. 27, 1988  4,773,763
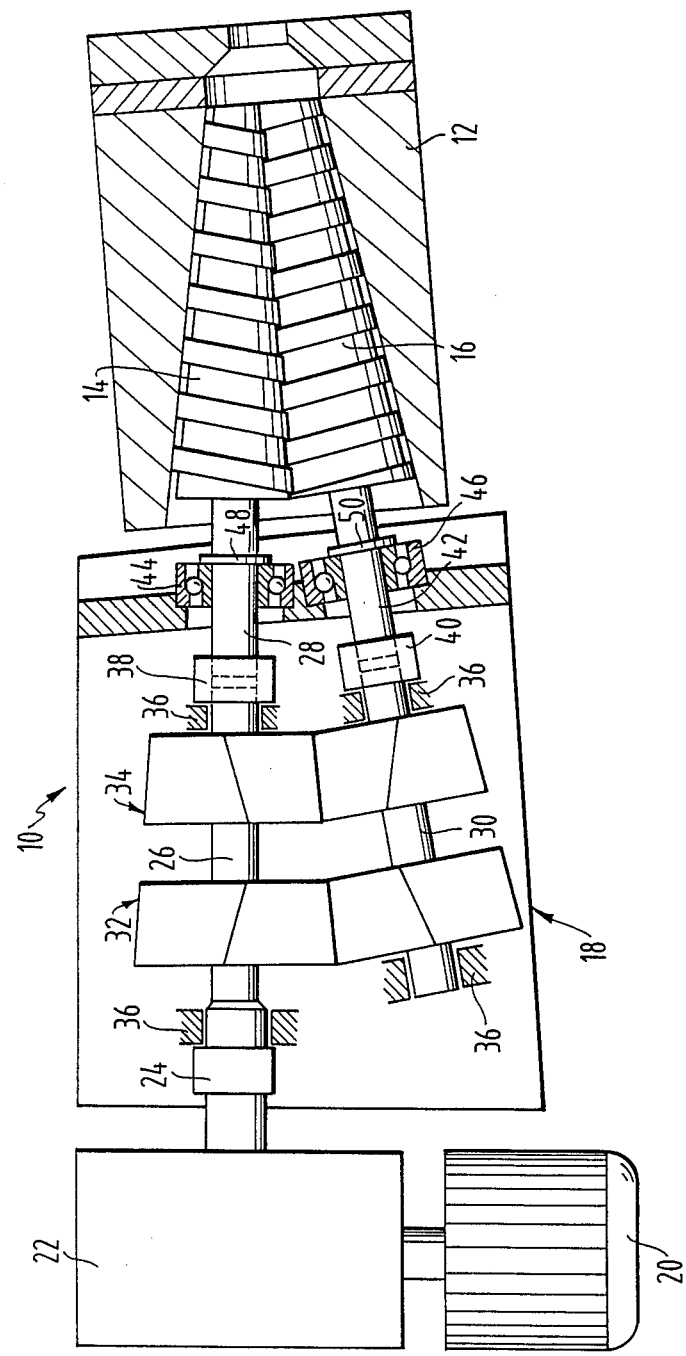

DOUBLE SCREW EXTRUDER

BACKGROUND OF THE INVENTION

The invention concerns a double screw extruder including two conical extruder screws, whose screw shafts form an angle with one another corresponding to the conicity of the extruder screws, and a drive apparatus with a drive motor which drives one of the screw shafts while the other screw shaft is driven from the first screw shaft through a bevel gear drive.

A double screw extruder of this type is for example known from U.S. Pat. No. 3,605,188.

The invention has as its object to construct a double screw extruder of the above described type wherein, within a small space, a high turning moment can be transferred to the screw shafts without thereby at the same time exerting axial forces on the screw shafts.

SUMMARY OF THE INVENTION

The object of the invention is solved in accordance with the invention in that the bevel gear drive is provided with teeth arranged or shaped in arrow or herringbone fashion. These teeth can be formed as true herringbone teeth, so that the bevel gear drive consists of two intermeshing bevel gears each with herringbone teeth. Instead of this however, two sets of counterrotating bevel gears with inclined teeth can be provided. The expression "bevel gears" in the present invention also includes those gears in which the surfaces of the teeth which pass through the crown circle and root circle do not intersect but are arranged parallel to one another.

With the construction of a bevel gear drive in accordance with the invention not only can high turning moments be transferred to the screw shafts with small construction length, but also the transmission of the turning moments occurs without the simultaneous transmission of axial forces, which in conventional constructions which must be captured by suitable thrust bearings. Because of this the drive takes on a very simple construction.

BRIEF DESCRIPTION OF THE DRAWING

The description which follows explains, in association with the accompanying drawing, the invention by way of one embodiment. The single FIGURE of the drawing is a schematic longitudinal section taken through a double screw extruder embodying the invention.

DETAILED DESCRIPTION OF THE PREFERRED EMBODIMENT

The double screw extruder, indicated generally at 10, includes a screw housing 12, with two conical extruder screws 14 and 16, as well as a drive indicated generally 18.

A drive motor 20, through a reducing drive 22 and through a coupling 24, drives a first drive shaft 26 which is rotationally fixed to the screw shaft 28 of the extruder screw 14. The first drive shaft 26 is coupled to a second drive shaft 30 by two counterrotating inclined tooth bevel gear sets 32 and 34. Both drive shafts 26 and 30 are journaled in bearings 36, indicated only schematically, and are connected with the screw shaft 28 of the extruder screw 14 and the screw shaft 42 of the extruder screw 16, respectively, by couplings 38 and 40, so that the drive 18 can be separated from the extruder housing 12 and the screw shafts 28 and 42.

Whereas no axial forces are exerted on the drive shafts and thereby on the screw shafts through the drive arrangement, the extruder screws 14 and 16 experience, through the material to be extruded, an axial rearward force in the direction toward the drive 18. Therefore, the screw shafts 28 and 42 are respectively journaled in thrust bearings 44 and 46 for absorbing the rearward forces, the thrust bearings 44 and 46 being arranged axially between the extruder screws 14 and 16 and the couplings 38 and 40. The screw shafts 28 and 42 abut the thrust bearings 44 and 46, respectively, with the help of a collar 48 or 50 or the like.

Instead of two sets of inclined tooth gears, in the case of otherwise similar parts, two intermeshing herringbone tooth bevel gears can be provided.

I claim:

1. A double screw extruder comprising two conical extruder screws fixed respectively to two screw shafts arranged at an angle to one another which corresponds to the conicity of the extruder screws, and a drive apparatus with a drive motor for driving one of the two screw shafts, and a bevel gear drive between said two screw shafts for driving the other of said screw shafts from said one screw shaft, characterized in that the bevel gear drive is provided with teeth arranged in herringbone fashion.

2. A double screw extruder according to claim 1 further characterized in that the bevel gear drive comprises two intermeshing bevel gears with herringbone teeth.

3. A double screw extruder according to claim 1 further characterized in that the bevel gear drive comprises two sets of counterrotating bevel gears with inclined teeth.

4. A double screw extruder according to claim 1 further characterized in that the bevel gear drive includes two sets of counter rotating inclined tooth bevel spur gears.

* * * * *